(12) United States Patent
Tabei et al.

(10) Patent No.: US 9,487,059 B2
(45) Date of Patent: Nov. 8, 2016

(54) VEHICLE AIR CONDITIONER

(75) Inventors: Koichi Tabei, Toyota (JP); Saburo Sakamoto, Obu (JP); Shinichirou Hirai, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 394 days.

(21) Appl. No.: 14/114,999

(22) PCT Filed: May 1, 2012

(86) PCT No.: PCT/JP2012/061564
§ 371 (c)(1),
(2), (4) Date: Oct. 31, 2013

(87) PCT Pub. No.: WO2012/153678
PCT Pub. Date: Nov. 15, 2012

(65) Prior Publication Data
US 2014/0080398 A1   Mar. 20, 2014

(30) Foreign Application Priority Data

May 11, 2011  (JP) .................................. 2011-106494

(51) Int. Cl.
*B60H 1/00* (2006.01)

(52) U.S. Cl.
CPC ...... *B60H 1/00642* (2013.01); *B60H 1/00785* (2013.01); *B60H 1/00849* (2013.01)

(58) Field of Classification Search
CPC .......... B60H 1/00642; B60H 1/00785; B60H 1/00849

USPC .......................................................... 454/75
See application file for complete search history.

(56) References Cited

U.S. PATENT DOCUMENTS

| | | | |
|---|---|---|---|
| 6,138,749 A | 10/2000 | Kawai et al. | |
| 6,213,198 B1 | 4/2001 | Shikata et al. | |
| 6,265,692 B1 | 7/2001 | Umebayahi et al. | |
| 6,352,102 B1 | 3/2002 | Takechi et al. | |

FOREIGN PATENT DOCUMENTS

| | | |
|---|---|---|
| DE | 19651279 A1 | 6/1997 |
| DE | 19613344 A1 | 10/1997 |
| DE | 19744290 A1 | 4/1998 |
| DE | 10012320 A1 | 9/2000 |
| JP | H11-11139 A | 1/1999 |
| JP | A-11-115463 | 4/1999 |
| JP | 2009-040242 A | 2/2009 |
| JP | A-2009-208620 | 9/2009 |

OTHER PUBLICATIONS

Jul. 15, 2015 Office Action issued in German Patent Applicaton No. 11 2012 002 039.1.

*Primary Examiner* — Helena Kosanovic
(74) *Attorney, Agent, or Firm* — Oliff PLC

(57) ABSTRACT

An air conditioner ECU can set an external air introducing mode and an internal/external air dual mode. Here, the internal/external air dual mode is set by the air conditioner ECU in cases in which the air conditioner ECU judges that there is a warm-up state that is after a start of a heating operation and in which a blow-out temperature of air conditioned wind is in the process of rising, and in cases in which humidity detected by a humidity sensor exceeds a reference humidity that is set in advance.

2 Claims, 3 Drawing Sheets

VEHICLE AIR CONDITIONER

TECHNICAL FIELD

The present invention relates to a vehicle air conditioner that conditions the air of a vehicle cabin interior.

BACKGROUND ART

There are vehicle air conditioners that, when the intake port mode is an internal/external air dual mode and there is a predetermined blow-out port mode, blows-out high-temperature internal air into the vehicle cabin interior from FOOT blow-out ports and heats the vehicle cabin interior, and blows-out low-humidity external air from DEF blow-out ports onto the inner surface of a windshield glass and improves the performance of defogging the front shield glass (see, for example, Patent Document 1).
[Patent Document 1] Japanese Patent Application Laid-Open No. H11-115463.

SUMMARY OF INVENTION

Technical Problem

However, the vehicle air conditioner does not operate in the internal/external air dual mode unless a predetermined blow-out port mode is set. Therefore, when a passenger who brings moist air into the vehicle cabin interior enters the vehicle, the air conditioning operation of defogging must be carried out each time thereof.

In view of the above-described circumstances, an object of the present invention is to provide a vehicle air conditioner that can exhibit both a defogging performance and a rapid heating ability even if a separate air conditioning operation is not carried out at the time when a passenger enters the vehicle.

Solution to Problem

A vehicle air conditioner relating to an aspect of the present invention comprises: a first flow passage that can guide external air introduced from an external air introduction port, or internal air introduced from an internal air introduction port, to a defroster blow-out port that opens toward a front windshield side of a vehicle cabin interior, and at which an evaporator that cools air is disposed midway along the first flow passage; a second flow passage that can guide external air introduced from the external air introduction port, or internal air introduced from the internal air introduction port, to a foot blow-out port that opens toward a passenger's seat foot side of the vehicle cabin interior, and at which the evaporator and a heating section that heats air are disposed midway along the second flow passage; a humidity detecting section that detects the humidity of air in the vehicle cabin interior; and an air conditioning control section that can set an external air introduction mode that introduces external air from the external air introduction port into the first flow passage and the second flow passage, and an internal air introduction mode that introduces internal air from the internal air introduction port into the first flow passage and the second flow passage, and an internal/external air dual mode that introduces the external air into the first flow passage and the internal air into the second flow passage, and that sets the internal/external air dual mode in cases in which the air conditioning control section identifies a warm-up state that is after a start of a heating operation and in which a blow-out temperature of air conditioned wind is in the process of rising, and in cases in which the humidity detected by the humidity detecting section exceeds a reference humidity that is set in advance.

In accordance with the vehicle air conditioner relating to the aspect of the present invention, at the first flow passage, external air introduced from the external air introduction port, or internal air introduced from the internal air introduction port, passes through the evaporator and is guided to the defroster blow-out port that opens toward the front windshield side of the vehicle cabin interior. In contrast, at the second flow passage, external air introduced from the external air introduction port, or internal air introduced from the internal air introduction port, passes through the evaporator and the heating section, and is guided to the foot blow-out port that opens toward the passenger's seat foot sides of the vehicle cabin interior. On the other hand, the external air introducing mode that introduces external air from the external air introduction port into the first flow passage and the second flow passage, and the internal air introducing mode that introduces internal air from the internal air introduction port into the first flow passage and the second flow passage, and the internal/external air dual mode that introduces external air into the first flow passage and internal air into the second flow passage, can be set by the air conditioning control section.

Here, the internal/external air dual mode is set by the air conditioning control section in cases in which the air conditioning control section identifies a warm-up state that is after the start of a heating operation and in which a blow-out temperature of air conditioned wind is in the process of rising, and in cases in which the humidity detected by the humidity detecting section exceeds a reference humidity that is set in advance. Therefore, the moisture that is brought-in by a passenger at the time when the passenger enters the vehicle is removed by the external air that is introduced into the first flow passage, and the passenger's seat foot sides are warmed rapidly by internal air that has passed through the second flow passage and has been heated.

Advantageous Effects of Invention

As described above, in accordance with the vehicle air conditioner relating to the aspect of the present invention, there is the excellent effect that both a defogging performance and a rapid heating ability can be exhibited even if a separate air conditioning operation is not carried out at the time when a passenger enters the vehicle.

DESCRIPTION OF EMBODIMENTS

Structure of Embodiment

Figure 1:
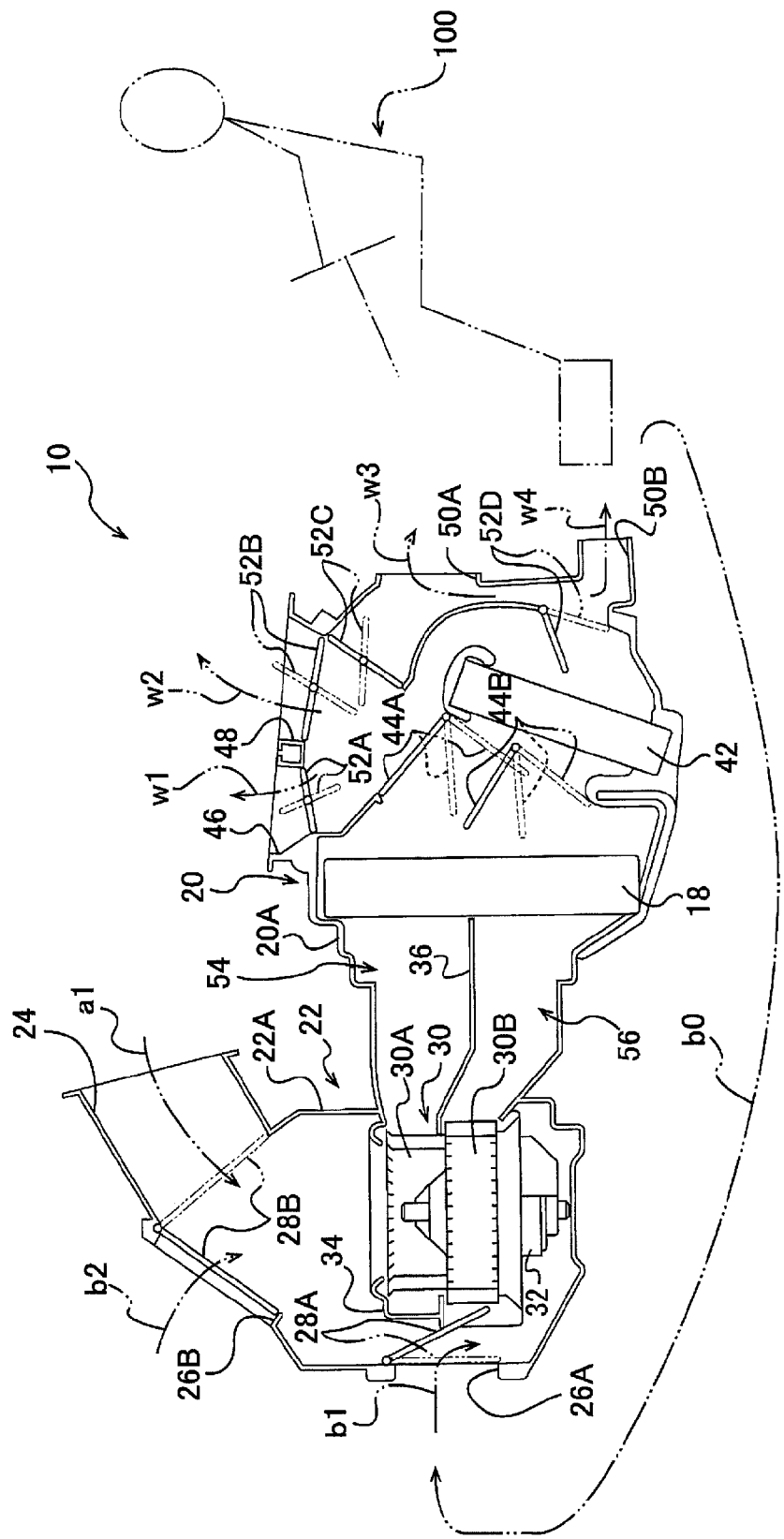
FIG. 1 is a schematic structural drawing showing an air conditioner relating to an embodiment of the present invention.
Figure 2:
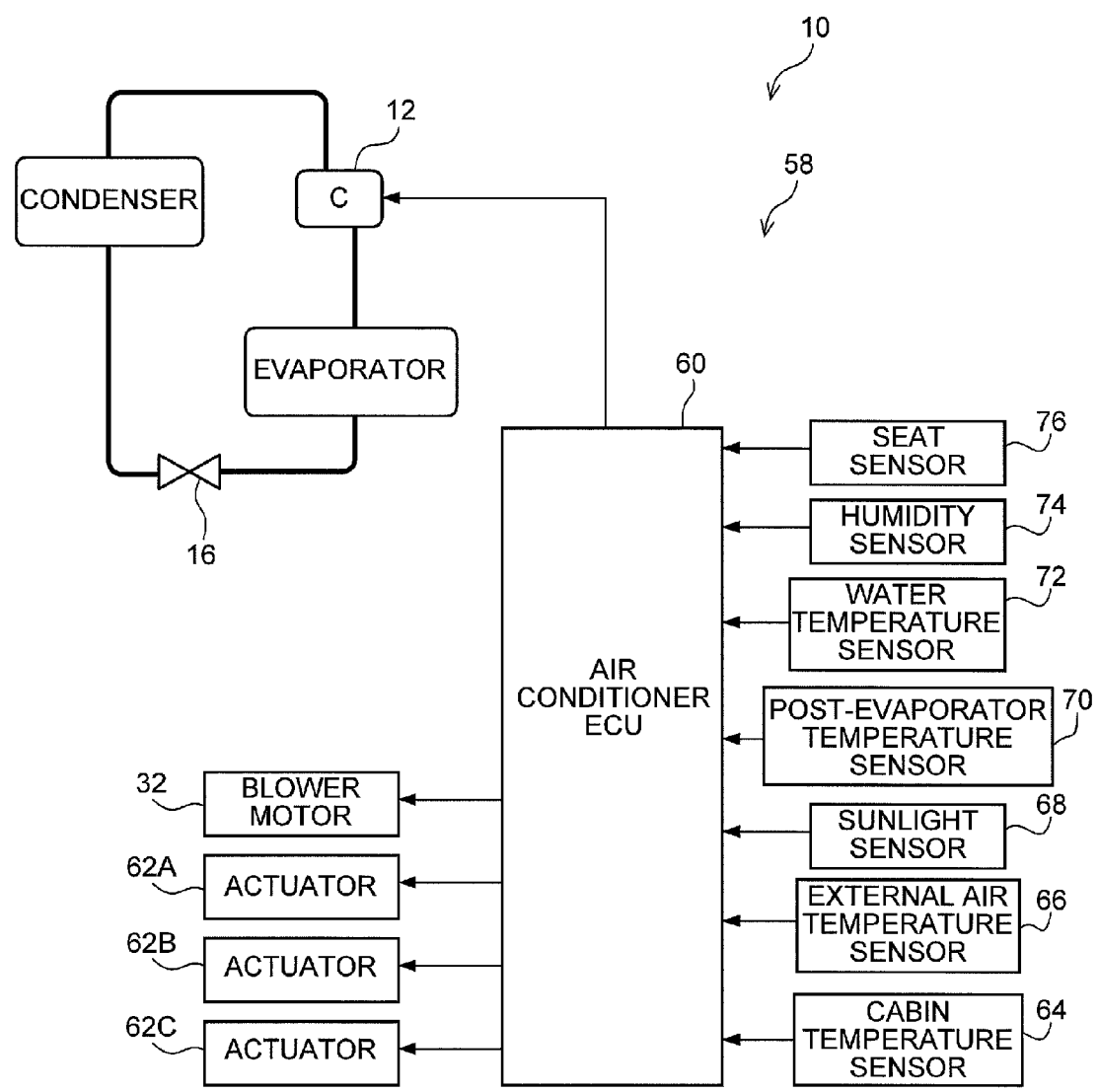
FIG. 2 is a schematic structural drawing showing, as blocks, a control section and the like of the air conditioner relating to the embodiment of the present invention.
Figure 3:
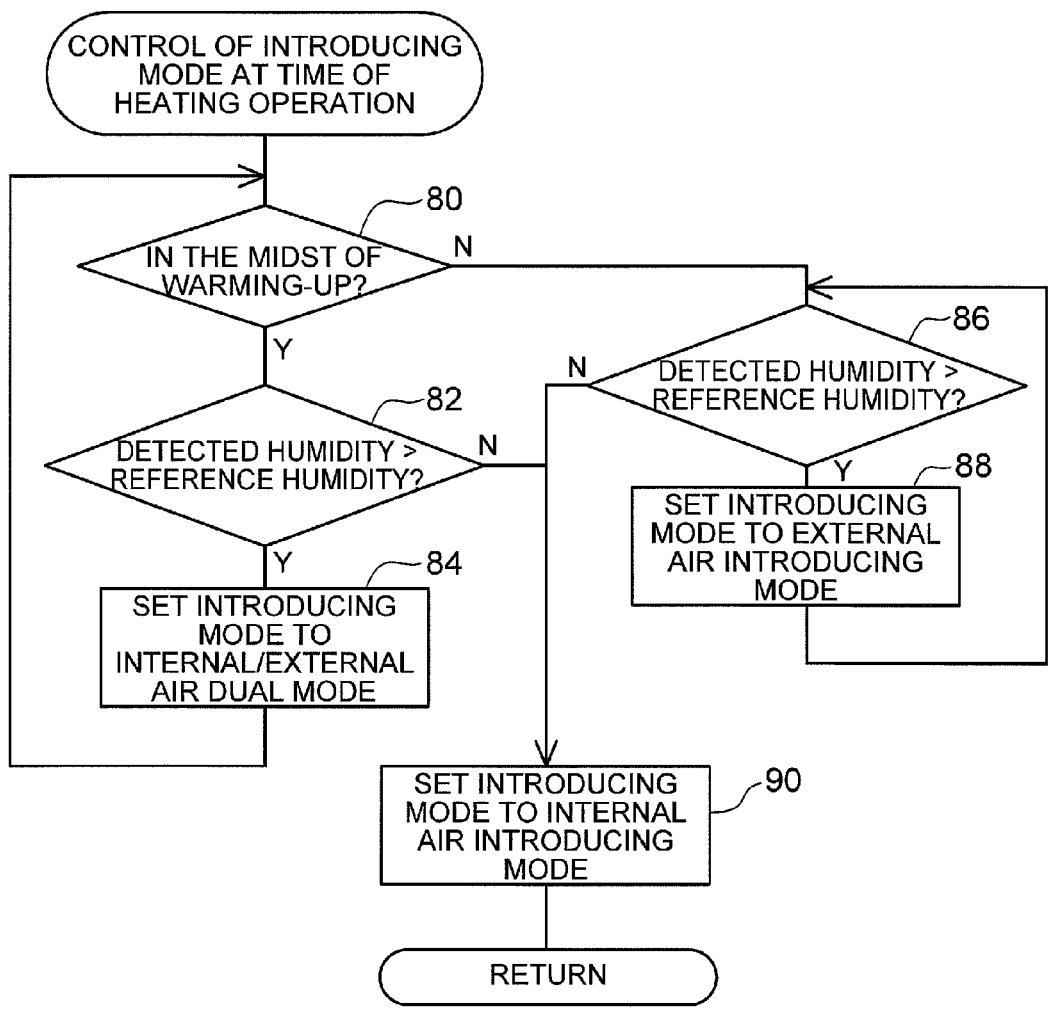
FIG. 3 is a flowchart showing the control of an introduction mode at the time of a heating operation of the air conditioner relating to the embodiment of the present invention.

An air conditioner 10 serving as a vehicle air conditioner relating to an embodiment of the present invention is described by using FIG. 1 through FIG. 3. The air conditioner 10 is shown in a schematic structural drawing in FIG. 1, and a schematic structural drawing in which a control section 58 and the like of the air conditioner 10 have been made into blocks is shown in FIG. 2.

As shown in FIG. 2, the air conditioner 10 carries out a refrigeration cycle by circulating a coolant by a structure that includes a compressor (compressor) 12, a condenser (condenser) 14, an expansion valve (expansion valve) 16, and an evaporator (evaporator) 18. In this refrigeration cycle, coolant that is compressed at the compressor 12 is liquefied by being cooled at the condenser 14, and, due to the liquefied coolant being gasified at the evaporator 18, cooling and dehumidifying of the air that passes through the evaporator 18 is carried out. At this time, the expansion value 16 makes the coolant into the form of a mist by suddenly reducing the pressure, and aims to improve the efficiency of gasifying the coolant at the evaporator 18. Note that a publicly-known, general structure can be applied as the structure that carries out the refrigeration cycle.

On the other hand, as shown in FIG. 1, the air conditioner 10 has an air conditioning unit 20 at whose interior is formed a flow passage of air conditioned wind, and has a blower unit 22 that introduces air that is used in generating the air conditioned wind. Note that, in the following description, explanation is given with the upper side in FIG. 1 being the upper portion sides of the air conditioning unit 20 and the blower unit 22, and the lower side in FIG. 1 being the lower portion sides of the air conditioning unit 20 and the blower unit 22.

First, the blower unit 22 is described. The blower unit 22 has a blower case 22A. An external air introduction port 24 that opens toward the vehicle exterior is formed in the blower case 22A, and a first internal air introduction port 26A and a second internal air introduction port 26B that open toward the vehicle cabin interior are formed in the blower case 22A. The first internal air introduction port 26A opens toward the vehicle front side at the front portion of the blower case 22A, and the second internal air introduction port 26B opens obliquely toward the vehicle upper side and front side at the upper portion of the blower case 22A and is provided adjacent to the vehicle front side of the external air introduction port 24. Note that, in FIG. 1, the flow of external air that is introduced-in from the external air introduction port 24 is shown by a1, the flow of internal air that is introduced-in from the second internal air introduction port 26B is shown by b2, and the flow of internal air that is introduced-in from the first internal air introduction port 26A is shown by b1.

A first switching door 28A (also called "internal air introduction door") that opens and closes the first internal air introduction port 26A is provided within the blower case 22A of the blower unit 22. This first switching door 28A is rotated between a closing position at which the first switching door 28A closes the first internal air introduction port 26A (the position shown by the two-dot chain lines in FIG. 1), and an opening position at which the first switching door 28A opens the first internal air introduction port 26A (the position shown by the solid lines in FIG. 1).

Further, a second switching door 28B (also called "internal/external air introduction door") that opens and closes the external air introduction port 24 and the second internal air introduction port 26B is provided within the blower case 22A of the blower unit 22. The second switching door 28B is rotated between a position of closing the external air introduction port 24 (the position shown by the two-dot chain lines in FIG. 1), and a position of closing the second internal air introduction port 26B (the position shown by the solid lines in FIG. 1). Namely, the second switching door 28B is rotated so as to, while gradually opening one of the external air introduction port 24 and the second internal air introduction port 26B, gradually close the other.

The first switching door 28A and the second switching door 28B are operated in accordance with an air introducing mode, and at least either of the external air introduction port 24, and the first and second internal air introduction ports 26A, 26B, is opened.

Further, at the blower unit 22, a blower fan 30 that draws-in external air and internal air is provided within the blower case 22A. In the present embodiment, a centrifugal multi-blade fan is used as the blower fan 30. This blower fan 30 is a structure that has a first fan 30A and a second fan 30B that are lined-up in the axial direction. At the blower fan 30, the first fan 30A and the second fan 30B are rotated and driven integrally by the driving of a blower motor 32. Further, due to at least either of the external air introduction port 24 and the first and second internal air introduction ports 26A, 26B being opened and the blower fan 30 being rotated and driven, at least one of air of the exterior of the vehicle (external air) and air of the vehicle cabin interior (internal air) is introduced into the blower case 22A of the blower unit 22, and the introduced-in air is sent into an air conditioner case 20A of the air conditioning unit 20.

A partitioning wall 34 is provided at the blower case 22A of the blower unit 22 so as to surround the first fan 30A of the blower fan 30. This partitioning wall 34 is disposed within the blower case 22A so as to partition the periphery of the blower fan 30 into the first fan 30A side and the second fan 30B side, i.e., an upper portion side and a lower portion side. Due thereto, at the blower fan 30, the first fan 30A draws-in air from the upper portion side of the blower unit 22, and the second fan 30B draws-in air from the lower portion side of the blower unit 22.

Further, the above-described first switching door 28A is disposed so as to, at the opening position at which the first switching door 28A opens the first internal air introduction port 26A (the position shown by the solid lines in FIG. 1), contact the partitioning wall 34 and partition the interior of the blower case 22A vertically. Due thereto, at the air conditioner 10, when the blower fan 30 is rotated and driven in the state in which the first internal air introduction port 26A is opened to the maximum degree of opening by the first switching door 28A, air of the vehicle cabin interior (internal air) is introduced-in from the first internal air introduction port 26A by the second fan 30B, and at least one of external air from the external air introduction port 24 and internal air from the second internal air introduction port 26B is introduced-in by the first fan 30A.

Here, due to the first internal air introduction port 26A being opened by the first switching door 28A and the second internal air introduction port 26B being closed (the external air introduction port 24 being opened) by the second switching door 28B, at the blower unit 22, external air is introduced-in by the first fan 30A, and internal air is introduced-in by the second fan 30B.

Further, at the blower unit 22, when the first internal air introduction port 26A is closed by the first switching door 28A, at least one of the external air introduced-in from the external air introduction port 24 and the internal air introduced-in from the second internal air introduction port 26B can circle-in to the second fan 30B. Due thereto, when the first internal air introduction port 26A is closed by the first switching door 28A, at least one of external air from the external air introduction port 24 and internal air from the second internal air introduction port 26B is introduced-in by the first fan 30A and the second fan 30B.

At the air conditioner 10, by controlling the opening/closing of the first switching door 28A and the second switching door 28B, the internal air introduction ratio, that is the ratio of internal air with respect to the amount of air that is introduced, can be adjusted in stages between 100% (the external air introduction ratio that is the ratio of external air with respect to the amount of air that is introduced is 0%) and 0% (the external air introduction ratio is 100%).

Here, at the air conditioner 10, as examples of the air introducing mode, in addition to an internal air introducing mode (internal air circulating mode) in which the internal air introduction ratio that is the ratio of internal air with respect to the amount of air that is introduced is 100%, and an external air introducing mode in which the internal air introduction ratio is 0% (the external air introduction ratio is 100%), it is possible to set an internal/external air introducing mode (an internal/external air dual mode) that introduces internal air and external air in a predetermined ratio. Note that, in the external air introducing mode, the first internal air introduction port 26A is closed by the first switching door 28A and the second internal air introduction port 26B is closed by the second switching door 28B, and, in the internal air introducing mode, the first internal air introduction port 26A is opened by the first switching door 28A and the external air introduction port 24 is closed by the second switching door 28. Further, in the internal/external air dual mode, the first internal air introduction port 26A is opened by the first switching door 28A and the second internal air introduction port 26B is closed (in other words, the external air introduction port 24 is opened) by the second switching door 28B.

The air conditioning unit 20 is described next. The air conditioning unit 20 has the air conditioner case 20A. This air conditioner case 20A is made integral with the blower case 22A of the blower unit 22, and the interiors thereof are communicated.

The evaporator 18 is disposed within the air conditioner case 20A of the air conditioning unit 20. The evaporator 18 is disposed at a position at which air, that is sent-in from the blower unit 22 side into the air conditioner case 20A, passes therethrough. Due to the compressor 12 (see FIG. 2) being operated, the evaporator 18 cools the air that passes through.

Further, a partitioning plate 36, that partitions the flow passage of air vertically, is provided between the evaporator 18 and the blower fan 30. Due to this partitioning plate 36, the air that is introduced-in by the first fan 30A is guided to the upper portion side of the evaporator 18, and the air that is introduced-in by the second fan 30B is guided to the lower portion side of the evaporator 18.

Further, a heater core 42 that serves as a heating section is provided within the air conditioner case 20A at the downstream side of the evaporator 18 at the lower portion side of the air conditioner case 20A interior. Engine cooling water is circulated between the heater core 42 and an unillustrated engine, and the heater core 42 heats the air that passes-through by heat exchange. The air that passes-through the heater core 42 and the air that bypasses the heater core 42 are mixed together, and air conditioned wind is generated.

A first air blend door 44A that can be disposed so as to face the upper portion side of the evaporator 18, and a second air blend door 44B that can be disposed so as to face the lower portion side of the evaporator 18, are respectively provided so as to be able to rotate at positions adjacent to the heater core 42. By changing the degrees of opening of the first and second air blend doors 44A, 44B, the amount of air that passes through the heater core 42 (the amount of air that is heated) and the amount of air that bypasses the heater core 42 are controlled. Due to such control, air conditioned wind of a predetermined temperature (a target blow-out temperature) is generated. Note that, in FIG. 1, the completely closed positions of the first and second air blend doors 44A, 44B with respect to the heater core 42 are shown by the two-dot chain lines, and the completely open positions of the first and second air blend doors 44A, 44B with respect to the heater core 42 are shown by the solid lines.

A defroster opening portion 46 is formed at the upper surface portion side of the air conditioner case 20A. This defroster opening portion 46 is connected to one end of a duct (not illustrated), and is an opening portion for blowing-out air that is within the air conditioner case 20A via the duct from defroster blow-out ports (not illustrated). In FIG. 1, the flow of the air conditioned wind that passes through the defroster opening portion 46 is shown by w1. The defroster blow-out ports open toward the front windshield (the wind glass) side of the vehicle cabin interior, and are disposed such that the wind from the defroster blow-out ports can be blown-out toward the inner surface of the front windshield. The defroster opening portion 46 that communicates with the defroster blow-out ports is opened and closed by a mode switching door 52A that is disposed within the air conditioner case 20A.

Further, a face opening portion 48 is formed at the upper surface portion side of the air conditioner case 20A, adjacent to the vehicle rear side of the defroster opening portion 46. The face opening portion 48 is connected to one end of an unillustrated duct (not illustrated), and is an opening portion for blowing-out air that is within the air conditioner case 20A via the duct from face register blow-out ports (not illustrated). In FIG. 1, the flow of the air conditioned wind that passes through the face opening portion 48 is shown by w2. The face register blow-out ports open toward the upper portion sides of the passengers' seats within the vehicle cabin, and are disposed such that the wind from the face register blow-out ports can be blown-out toward the upper portion sides of the passengers' seats. The face opening portion 48 that communicates with the face register blow-out ports is opened and closed by a mode switching door 52B. Note that, in FIG. 1, a passenger who is seated in a passenger's seat is illustrated schematically by two-dot chain lines and is denoted by reference numeral 100.

Moreover, foot opening portions 50A, 50B are formed at the rear surface portion side of the air conditioner case 20A. The foot opening portions 50A, 50B are connected to one ends of unillustrated ducts (not illustrated) respectively, and are opening portions for blowing-out air that is within the air conditioner case 20A via the ducts from foot blow-out ports (not illustrated). In FIG. 1, the flow of air conditioned wind that passes through the foot opening portion 50A is shown by w3, and the flow of air conditioned wind that passes through the foot opening portion 50B is shown by w4. The foot blow-out ports open toward the foot sides of the passengers' seats within the vehicle cabin, and are disposed such that the wind from the foot blow-out ports can be blown-out toward the foot sides of the passengers' seats (the feet of the passengers who are seated in the front seats and the rear seats). The foot opening portions 50A, 50B that communicate with the foot blow-out ports are opened and closed by mode switching doors 52C, 52D. Note that the foot opening portion 50A is for the front seats, and the foot opening portion 50B is for the rear seats.

At the air conditioner 10, a DEF mode that selects blowing-out from the defroster blow-out ports, a FACE mode that selects blowing-out from the face register blow-out ports, a FOOT mode that selects blowing-out from the foot blow-out ports, a FOOT/DEF mode that selects blowing-out from the defroster blow-out ports and the foot blow-out ports, and a BI-LEVEL mode that selects blowing-out from the face register blow-out ports and the foot blow-out ports, are set as the air conditioned wind blow-out modes. At the air conditioner 10, due to the mode switching doors 52A, 52B, 52C, 52B being operated in accordance with the blow-out mode, air conditioned wind is blown-out from the blow-out ports that correspond to the blow-out mode, and the air of the vehicle cabin interior is conditioned.

In contrast, a first flow passage 54, at which air that is introduced-in by the first fan 30A of the blower fan 30 flows through the upper portion of the air conditioner case 20A interior, and a second flow passage 56, at which air that is introduced-in by the second fan 30B of the blower fan 30 flows through the lower portion of the air conditioner case 20A interior, can be set as the flow passages within the air conditioner 10.

The first flow passage 54 is a flow passage that can guide the external air, that is introduced-in from the external air introduction port 24 by the first fan 30A of the blower fan 30, or the internal air, that is introduced-in from the second internal air introduction port 26B, to the defroster blow-out ports (not illustrated) via the defroster opening portion 46 and the duct (not illustrated). Midway along the flow passage, the air that flows through the first flow passage 54 passes through the upper portion of the evaporator 18 and is cooled, and bypasses the heater core 42. Such a first flow passage 54 is formed by the first air blend door 44A being set at a position that forms a flow passage that bypasses the heater core 42 at the upper portion of the air conditioner case 20A interior (e.g., shown by the dashed lines and the two-dot chain lines in FIG. 1) and the mode switching door 52A being set at a position that opens the defroster opening portion 46 (shown by the two-dot chain lines in FIG. 1).

Further, the second flow passage 56 is a flow passage that can guide external air, that is introduced-in from the external air introduction port 24 by the second fan 30B of the blower fan 30, or internal air, that is introduced-in from the first and second internal air introduction ports 26A, 26B, to the foot blow-out ports (not illustrated) via the foot opening portions 50A, 50B and the ducts (not illustrated). Midway along the flow passage, the air that flows through the second flow passage 56 passes through the lower portion of the evaporator 18 and is cooled, and passes through the heater core 42 and is heated. Such a second flow passage 56 is formed by the second air blend door 44B being set at a position that forms a flow passage that passes through the heater core 42 at the lower portion of the air conditioner case 20A interior (e.g., shown by the solid lines and the dashed lines in FIG. 1) and the mode switching door 52D being set at a position that opens the foot opening portions 50A, 50B (shown by the solid lines in FIG. 1).

Further, when forming the first flow passage 54 and the second flow passage 56, the mode switching door 52C is closed in order to partition and form the both (shown by the solid lines in FIG. 1).

Here, to supplementarily describe the relationship between the first flow passage 54 and the second flow passage 56 and the air introducing mode, in the external air introducing mode, external air from the external air introduction port 24 is introduced into the first flow passage 54 and the second flow passage 56, and, in the internal air introducing mode, internal air from the first and second internal air introduction ports 26A, 26B is introduced into the first flow passage 54 and the second flow passage 56, and, in the internal/external air dual mode, external air from the external air introduction port 24 is introduced into the first flow passage 54 and internal air from the first internal air introduction port 26A is introduced into the second flow passage 56. Further, the external air introducing mode, the internal air introducing mode and the internal/external air introducing mode can be set by an air conditioner ECU 60 (see FIG. 2) that serves as a air conditioning control section and is described later.

As shown in FIG. 2, the air conditioner ECU 60 is a part of the control section 58 that controls the operation of the air conditioner 10. A microcomputer at which a CPU, a ROM, a RAM and the like are connected by a bus, various types of input/output interfaces, driving circuits and the like (none of which are illustrated) are provided at the air conditioner ECU 60. The CPU is a general structure that controls the operation of the air conditioner 10 on the basis of programs that are stored in the ROM or the like.

The compressor 12 is connected to the air conditioner ECU 60, and the air conditioner ECU 60 controls the driving/stopping and the coolant ejection pressure at the time of driving of the compressor 12. Due thereto, the cooling capacity of the air conditioner 10 is controlled. Note that the compressor 12 may be a structure that is driven by the engine, or may be a structure that is driven by an electric motor (a compressor motor).

The blower motor 32 is connected to the air conditioner ECU 60. The air conditioner ECU 60 controls the wind amount of the air conditioned wind (the blower wind amount) that is blown-out into the vehicle cabin by controlling the driving/stopping and the number of revolutions at the time of driving of the blower motor 32.

Further, an actuator 62A that operates the first and second switching doors 28A, 28B (see FIG. 1), an actuator 62B that operates the mode switching doors 52A, 52B, 52C, 52D (see FIG. 1), and an actuator 62C that operates the first and second air blend doors 44A, 44B (see FIG. 1) are connected to the air conditioner ECU 60. The air conditioner ECU 60 carries out control of the operation of the actuator 62A that corresponds to the air introducing mode, and operation of the actuator 62B that corresponds to the air conditioned wind blow-out mode, and operation of the actuator 62C that corresponds to the target blow-out temperature (adjusting of the degrees of opening of the first and second air blend doors 44A, 44B). Note that the actuators 62A, 62B, 62C may respectively be structured by plural actuators.

Further, various types of sensors such as a cabin temperature sensor 64 (cabin temperature detecting section) that detects the temperature of the air within the vehicle cabin, an external air temperature sensor 66 (external air temperature detecting section) that detects the temperature of the vehicle exterior (external air temperature), a sunlight sensor 68 that detects the amount of sunlight, a post-evaporator temperature sensor 70 that detects the temperature of the air that has passed through the evaporator 18 (post-evaporator temperature), a water temperature sensor 72 that detects the temperature (water temperature) of the engine cooling water that is circulated to the heater core 42 (see FIG. 1), and the like are connected to the air conditioner ECU 60. Here, the cabin temperature sensor 64, the external air temperature sensor 66 and the water temperature sensor 72 can also be interpreted as devices for judging warming-up at the time of the heating operation.

At the air conditioner 60, operating conditions such as the set temperature and the like are set by switch operation of an unillustrated operation panel, and, when the start of an air conditioning operation is instructed, the air conditioner ECU 60 carries out an air conditioning operation so that the vehicle cabin interior becomes the set temperature, on the basis of the operating conditions and the environment state and the operating state that are detected by the above-described various types of sensors.

On the basis of the set temperature, the cabin temperature, the external air temperature, the amount of sunlight and the like, the air conditioner ECU 60 sets the target blow-out temperature that is the temperature of the air conditioned wind for making the vehicle cabin interior be the set temperature, and controls the heating capacity and the cooling capacity such that air conditioned wind of the target blow-out temperature that was set is obtained. Further, when air conditioning operation in an auto mode is set, the air conditioner ECU 60 sets the operating conditions such as the blower wind amount, the blower mode of the air conditioned wind and the like, on the basis of the target blow-out temperature, and carries out air conditioning operation under the set operating conditions. Note that publicly-known, general structures can be applied as the structures of the basic portions of such air conditioning operation control by the air conditioner ECU 60, and detailed description thereof is omitted here.

Further, a humidity sensor 74, that serves as a humidity detecting portion that detects the humidity of the vehicle cabin interior, is connected to the air conditioner ECU 60. As an example, the humidity sensor 74 is disposed at the inner surface side of the front windshield, and can also be interpreted as a device for judging the ease of fogging of the inner surface of the front windshield. For example, a structure having a humidity sensor element, that is provided with a humidity-sensitive resistance film between electrodes that are disposed as a pair, can be used as the humidity sensor 74. At this humidity sensor element, the humidity-sensitive resistance film swells (absorbs moisture) when the humidity is high, and shrinks (dries) due to the humidity becoming lower. Due thereto, at this humidity sensor element, the resistance value between the pair of electrodes changes. The humidity sensor 74 changes the output voltage in accordance with the change in the resistance value between the pair of electrodes. The air conditioner ECU 60 detects the humidity of the vehicle cabin interior by detecting the change in the output voltage and converting it into humidity (relative humidity).

Here, the air conditioner ECU 60 sets the internal/external air dual mode in cases in which it is judged that there is a warm-up state that is after the start of the heating operation and in which the blow-out temperature of the air conditioned wind is in the process of rising, and in cases in which the humidity detected by the humidity sensor 74 exceeds a reference humidity that is set in advance.

Further, seat sensors 76 (riding sensing portions), that sense that passengers are riding in the vehicle, are connected to the air conditioner ECU 60. The seat sensors 76 are disposed on the vehicle seats within the vehicle cabin, and can sense that passengers are riding in the vehicle by upper and lower electrodes being turned ON by the load of a seated passenger.

Operation/Effects of Embodiment

The operation and effects of the above-described embodiment are described next with reference to FIG. 3. Control of the introducing mode at the time of the heating operation at the air conditioner ECU 60 is shown in a flowchart in FIG. 3. Note that the processing of FIG. 3 is executed due to an unillustrated ignition switch being turned on and, for example, the start of air conditioning operation in the auto mode being instructed. Further, it suffices for this processing to be executed at the time of the heating operation of the air conditioner 10.

In initial step 80, it is confirmed whether or not the air conditioner 10 is in the midst of warm-up. At the air conditioner 10, air conditioning operation in the heating mode, in which the set temperature is high as compared with the cabin temperature detected by the cabin temperature sensor 64 shown in FIG. 2 or the external air temperature detected by the external air temperature sensor 66, is set as an example. Further, at the air conditioner 10, when air conditioning operation is carried out in the heating mode, any of the FOOT mode, the BI-LEVEL mode or the FOOT/DEF mode is selected as the air conditioned wind blow-out mode. Moreover, at the air conditioner 10, when air conditioning operation in the heating mode is started, warming-up is carried out if the temperature of the cooling water (water temperature) detected by the water temperature sensor 72 is low (when the water temperature is less than or equal to a lowest water temperature that is set in advance).

In this warming up, the blower fan 30 shown in FIG. 1 is stopped, and, when the water temperature of the cooling water rises to a predetermined temperature (e.g., the aforementioned lowest water temperature) due to the warming-up operation of the engine, the blower fan 30 is rotated and driven such that there becomes the minimum wind amount. Thereafter, at the air conditioner 10, the blower fan 30 is driven such that the blower wind amount increases in conformance with the rise in the water temperature of the cooling water.

Further, when the water temperature of the cooling water rises to a temperature at which a predetermined heating capacity can be ensured, the warming-up is ended, and an air conditioning operation (heating operation) at the target blow-out temperature and at a blower wind amount that is based on this target blow-out temperature is carried out.

Here, if in the midst of the warming-up (a warm-up state), the air conditioner ECU 60 (see FIG. 2) makes an affirmative judgment in step 80 of FIG. 3, and moves on to step 82. In this step 82, it is judged whether or not the humidity of the vehicle cabin interior that is detected by the humidity sensor 74 shown in FIG. 2 is higher than a reference humidity that is set in advance. The reference humidity is set to the upper limit value (or a value that is slightly lower than the upper limit value) of humidities at which it is judged that fogging will not occur at the inner surface of the front windshield within the vehicle cabin. If the detected humidity is higher than this reference humidity, the air conditioner ECU 60 makes an affirmative judgment in step 82 of FIG. 3, and proceeds to step 84.

In step 84, the air introducing mode is set to the internal/external air dual mode. Due thereto, at the air conditioner 10 shown in FIG. 1, the first internal air introduction port 26A is opened by the first switching door 28A, and the external air introduction port 24 is opened and the second internal air introduction port 26B is closed by the second switching door 28B. At this time, at the air conditioner ECU 60 (see FIG. 2), by setting the first and second air blend doors 44A, 44B in half-opened states, the first flow passage 54, that passes through the evaporator 18 from the external air introduction port 24 and goes via the defroster opening portion 46 and reaches the defroster blow-out ports (not illustrated) is formed, and moreover, due to the mode switching door 52C being closed and the mode switching door 52D being opened, the second flow passage 56, that passes through the evaporator 18 and the heater core 42 from the first internal air introduction port 26A and goes via the foot opening portions 50A, 50B and reaches the foot blow-out ports (not illustrated), is formed.

Therefore, due to external air, that has been introduced into the first flow passage 54, being blown-out toward the front windshield from the defroster blow-out ports (not illustrated) (in other words, due to dry external air being made to flow toward the cabin interior upper portion side), the moisture that has been brought-in by the passenger at the time of entering the vehicle is removed in a vicinity of the front windshield. Therefore, fogging of the front windshield is suppressed. On the other hand, due to internal air, that has passed through the second flow passage 56 and been heated at the heater core 42, being blown-out toward the passenger's seat foot sides from the foot blow-out ports (not illustrated) (in other words, due to warm internal air being circulated), the passenger's seat foot side is warmed quickly.

To supplementarily describe heating of the passengers' feet, at the air conditioner 10, internal air circulation is carried out between the second flow passage 56 and the vehicle cabin interior lower portion side (refer to arrows w3, w4, b0, b1 of FIG. 1). Therefore, warm air that has been warmed at the heater core 42 is again drawn-in and warmed at the heater core 42, and a decrease in the water temperature of the engine cooling water at the heater core 42 is suppressed. Accordingly, the heater blow-out temperature from the foot blow-out ports can be raised rapidly, and a rapid heating ability is ensured. Therefore, for example, in a hybrid car, the frequency of turning the engine ON is suppressed and the fuel economy improves.

Further, if the detected humidity is less than or equal to the reference humidity, the air conditioner ECU 60 (see FIG. 2) makes a negative judgment in step 82 of FIG. 3, and moves on to step 90. In step 90, the air introducing mode is set to the internal air introducing mode (internal air circulating mode). Due thereto, at the air conditioner 10 shown in FIG. 1, the first internal air introduction port 26A is opened by the first switching door 28A, and the second internal air introduction port 26B is opened and the external air introduction port 24 is closed by the second switching door 28B, and internal air is introduced into the blower case 22A. Here, if the detected humidity is low, even if internal air is circulated and blown-out, fogging of the front windshield does not occur, and further, the heating efficiency improves due to the warmed internal air being circulated.

To supplementarily describe the internal air circulation, when internal air circulation is carried out over a long time (internal aerification), the warm air that has been warmed at the heater core 42 is again drawn-in and heated. Therefore, a decrease in the water temperature of the engine cooling water at the heater core 42 is suppressed and the heating efficiency (the rapid heating performance) is good, and further, wasteful emission of heat due to ventilating of the blower fan 30 is suppressed. Therefore, in the same way as supplementarily described with regard to heating in the internal/external air dual mode, in a hybrid car for example, the frequency of turning the engine ON is suppressed and the fuel economy improves.

On the other hand, when warming-up ends, the air conditioner ECU 60 (see FIG. 2) makes a negative judgment in step 80 of FIG. 3 and proceeds to step 86. In this step 86, it is judged whether or not the humidity of the vehicle cabin interior that is detected by the humidity sensor 74 (see FIG. 2) is higher than the reference humidity that was set in advance. The reference humidity is set to the same humidity as in step 82. If the detected humidity is higher than the reference humidity, the air conditioner ECU 60 makes an affirmative judgment in step 86 and moves on to step 88.

In step 88, the air introducing mode is set to the external air introducing mode. Due thereto, at the air conditioner 10 shown in FIG. 1, the first internal air introduction port 26A is closed by the first switching door 28A, and the second internal air introduction port 26B is closed and the external air introduction port 24 is opened by the second switching door 28B, and external air is introduced into the blower case 22A. Due thereto, the defogging performance is ensured.

In step 86 of FIG. 3, in cases in which the detected humidity is less than or equal to the aforementioned reference humidity from the start, and in cases in which, after the air introducing mode is set to the external air introducing mode in step 88, the detected humidity becomes less than or equal to the aforementioned reference humidity, the air conditioner ECU 60 (see FIG. 2) makes a negative judgment and moves on to step 90, and sets the air introducing mode to the internal air introducing mode (internal air circulating mode).

As described above, in accordance with the air conditioner 10 relating to the present embodiment, both a defogging performance and a rapid heating performance can be achieved even without carrying out a separate air conditioning operation at the time when a passenger enters the vehicle.

Supplementary Explanation of Embodiment

Note that the air conditioner 10 shown in FIG. 1 and FIG. 2 can be applied to a vehicle of an arbitrary structure, such as a conventional car that travels due to the driving force of an engine, a hybrid car that travels due to the driving force of an engine or an electric motor, an electric car that travels due to driving force of an electric motor, or the like.

Further, in the above-described embodiment, the heater core 42 is used as the heating section, but, in addition to the heater core 42, an electric heating section such as a PCT heater or the like may be provided as the heating section. Or, a heating section of a publicly-known, arbitrary structure, such as an electric heating section or the like, can be applied instead of the heater core 42.

Further, in the above-described embodiment, there is a structure in which the humidity sensor 74 that serves as the humidity detecting section is structured as a body separate from the cabin temperature sensor 64. However, the humidity detecting section may be another humidity detecting section such as, for example, an internal air sensor that is made integral with the cabin temperature sensor 64, or the like.

Further, in the above-described embodiment, the seat sensor 76 is applied as the riding sensing portion. However, the riding sensing portion may be another riding sensing portion such as, for example, a riding sensing device that is structured to include a door closing sensing sensor that senses that a vehicle door has been closed, and a belt application sensor that senses application of the belt of a seatbelt device, and that judges that a passenger is riding in the vehicle when the vehicle door has been closed and the belt of the seatbelt device has been applied, or the like.

Note that the above-described embodiment and above-described plural modified examples can be implemented by being combined appropriately.

Note that the disclosure of Japanese Patent Application No. 2011-106494 is, in its entirety, incorporated by reference into the present Description.

The invention claimed is:

1. A vehicle air conditioner, comprising:
a first flow passage that can guide external air introduced from an external air introduction port, or internal air introduced from an internal air introduction port, to a defroster blow-out port that opens toward a front windshield side of a vehicle cabin interior, and at which an evaporator that cools air is disposed midway along the first flow passage;
a second flow passage that can guide external air introduced from the external air introduction port, or internal air introduced from the internal air introduction port, to a foot blow-out port that opens toward a passenger's seat foot side of the vehicle cabin interior, and at which the evaporator and a heating section that heats air are disposed midway along the second flow passage;
a humidity detecting section that detects the humidity of air in the vehicle cabin interior; and
an air conditioning control section that can set an external air introduction mode that introduces external air from the external air introduction port into the first flow passage and the second flow passage, and an internal air introduction mode that introduces internal air from the internal air introduction port into the first flow passage and the second flow passage, and an internal/external air dual mode that introduces the external air into the first flow passage and the internal air into the second flow passage, and that sets the internal/external air dual mode, at all times in cases in which the air conditioning control section identifies a warm-up state that is after a start of a heating operation and in which a blow-out temperature of air conditioned wind is in the process of rising, and in which the humidity detected by the humidity detecting section exceeds a reference humidity that is set in advance.

2. The vehicle air conditioner according to claim 1, wherein:
in cases in which the air conditioning control section judges that the warm-up state is completed,
the air conditioning controlling section sets the external air introduction mode in cases in which the humidity detected by the humidity detecting section exceeds the reference humidity; and
the air conditioning controlling section sets the internal air introduction mode in cases in which the humidity detected by the humidity detecting section is equal to or less than the reference humidity, and
in cases in which the air conditioning control section judges that the warm-up state is in progress, the air conditioning controlling section sets the internal air introduction mode in cases in which the humidity detected by the humidity detecting section is equal to or less than the reference humidity.

* * * * *